(No Model.)
J. P. DUTHIE.
HAME FASTENER.
No. 344,360. Patented June 29, 1886.
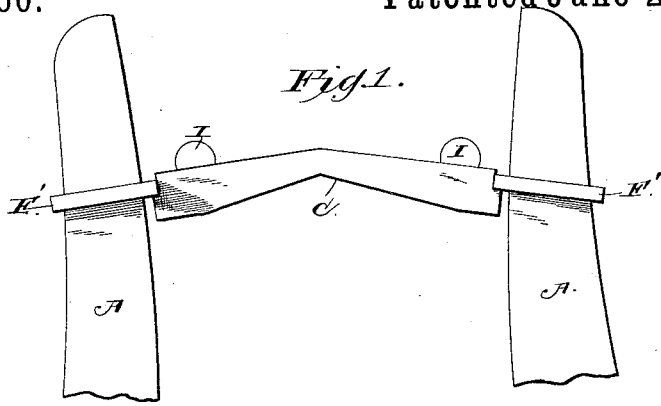
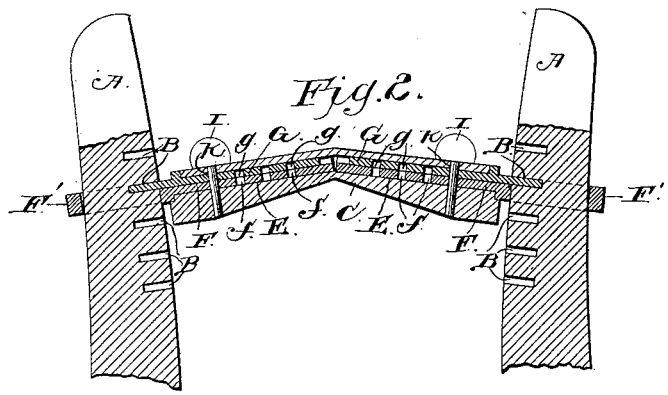
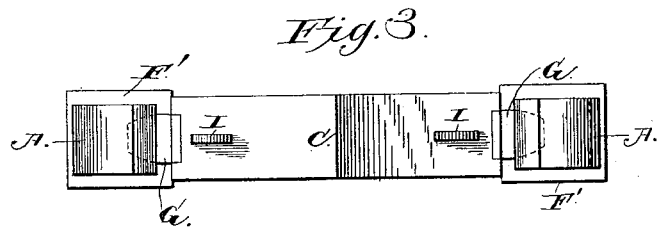
Witnesses
M. E. Fowler
J. W. Garner
Inventor
J. P. Duthie
By his Attorneys
C. A. Snow & Co.

UNITED STATES PATENT OFFICE.

JOHN P. DUTHIE, OF REE HEIGHTS, DAKOTA TERRITORY.

HAME-FASTENER.

SPECIFICATION forming part of Letters Patent No. 344,360, dated June 29, 1886.

Application filed April 8, 1886. Serial No. 198,265. (No model.)

*To all whom it may concern:*

Be it known that I, JOHN P. DUTHIE, a citizen of the United States, residing at Ree Heights, in the county of Hand and Territory of Dakota, have invented a new and useful Improvement in Hame-Fasteners, of which the following is a specification.

My invention relates to an improvement in Hame-Fasteners; and it consists in the peculiar construction and combination of devices that will be more fully set forth hereinafter, and particularly pointed out in the claims.

In the drawings, Figure 1 is an elevation of the upper portion of a pair of hames provided with my improved fastening devices. Fig. 2 is a sectional view of the same. Fig. 3 is a top plan view.

A represents the hames, which have their lower ends connected together by the usual strap, which is not here shown, as it forms no part of this invention. In the upper portion of the hames, on the opposing sides thereof, are made series of openings B.

C represents a connecting arm or bar, which is fitted between the upper ends of the hames, to secure the upper portions of the hames together. In the upper side of the bar C, at the ends thereof, are made longitudinal openings or recesses E, in which are secured sliding tongues F and G. The tongues F are recessed or grooved on their upper sides to receive the tongues G, and the said tongues G and F are provided with the series of transverse openings *f* and *g*, as shown. Loops F' are formed at the outer ends of the tongues F, which loops pass over the upper ends of the hames. The outer ends of the tongues G are adapted to enter the openings B in the opposing sides of the hames, and thereby prevent the bar C from moving vertically on the hames.

The tongues F and G may be drawn in or out in the openings in the ends of the bar C, and thus move the upper ends of the hames laterally toward or from each other and adapt them to fit a collar of any width, and the tongues F and G are secured at any desired adjustment by means of pins I, which pass through openings K in the upper sides of the bar C and enter the openings *f* and *g* in the extensible tongues.

A hame-fastener thus constructed may be made of any suitable material, preferably of metal, is cheap and simple, is adjustable vertically on the hames, and permits the latter to be moved laterally, thereby enabling the hames to be fitted to collars of different sizes.

Having thus described my invention, I claim—

1. The combination, with the hames having the openings B in their opposing sides, of the bar C, having the extensible tongues G, for entering the said openings, and the extensible tongues F, having the loops F', for engaging with the hames, and means for securing the said tongues F and G at any desired adjustment, substantially as described.

2. The combination, with the hames having the openings B in their opposing sides, of the bar C, having the extensible tongues F and G in its ends, the tongue F, having the openings *f*, and provided with the loops F', to engage with the hames, and the tongues G, being adapted to engage with the openings B and provided with the openings *g*, and the pins I, fitting in openings K in the bar and adapted to pass through the openings in the tongues, for the purpose set forth, substantially as described.

In testimony that I claim the foregoing as my own I have hereto affixed my signature in presence of two witnesses.

JOHN P. DUTHIE.

Witnesses:
   A. G. HAYDEN,
   S. V. GHRIST.